No. 885,766. PATENTED APR. 28, 1908.
C. G. P. DE LAVAL.
PROCESS OF OBTAINING A VIOLENT CHEMICAL REACTION BETWEEN MATERIALS.
APPLICATION FILED JULY 15, 1905.

Witnesses

Inventor
Carl Gustaf Patrik de Laval

Attorneys

UNITED STATES PATENT OFFICE.

CARL GUSTAF PATRIK DE LAVAL, OF STOCKHOLM, SWEDEN, ASSIGNOR TO SOCIÉTÉ ANONYME MÉTALLURGIQUE PROCÉDÉS DE LAVAL, OF FRANKFORT-ON-THE-MAIN, GERMANY, A CORPORATION OF BELGIUM.

PROCESS OF OBTAINING A VIOLENT CHEMICAL REACTION BETWEEN MATERIALS.

No. 885,766.      Specification of Letters Patent.      Patented April 28, 1908.

Application filed July 15, 1905. Serial No. 269,755.

*To all whom it may concern:*

Be it known that I, CARL GUSTAF PATRIK DE LAVAL, engineer and doctor of philosophy, subject of the King of Sweden, residing at Kungsträdgårdsgatan 2 C, Stockholm, Sweden, have invented new and useful Improvements in Processes for Obtaining a Violent Chemical Reaction between Materials, of which the following is a specification.

It is commonly desirable especially for industrial purpose to obtain violent chemical reaction between materials which are subject to chemical influence. For this reason, when treating solid materials, they are preferably used in a pulverous form. The difficulties accompanying the employment of a pulverous charge to be treated in a furnace, are well known, particularly in the case of the iron industry. With a view to overcoming such difficulties it has been proposed to form briquets of the material to be treated, which method however besides being very expensive also removes the advantages resulting from the use of powder, viz. that the chemical reactions are carried out completely and suddenly.

Now this invention has for object a method of bringing about violent chemical reaction between materials, and may be employed for materials in pulverous, liquid or gaseous form. According thereto the material to be treated is introduced continuously and uniformly into a furnace in which a gas or air current is simultaneously very rapidly rotating or whirling. By means of such gas or air current the material will also be caused to rotate or whirl and will be very intimately mixed with the said air or gas, thereby occasioning the chemical reactions to be effected suddenly.

In order that the invention may be fully understood reference will be made to the accompanying drawing which illustrates, by way of example, a furnace designed for the reduction of iron ore.

Figure 1:
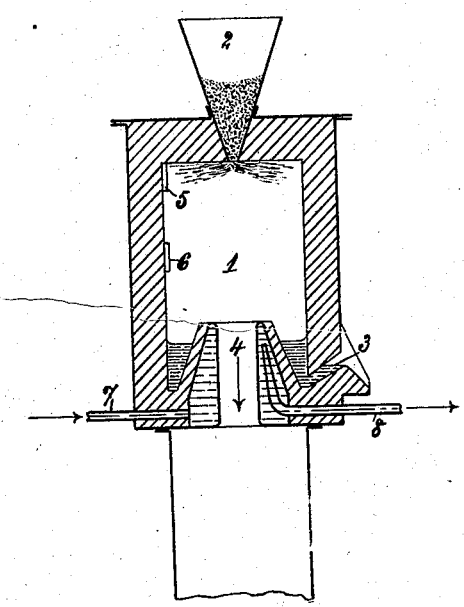
Figure 2:
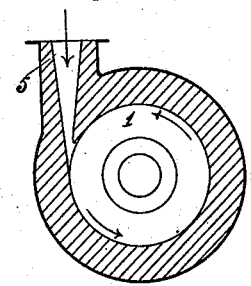
Figure 2:

Figure 1 shows the furnace in vertical section, and Fig. 2 in horizontal section.

1 indicates the furnace chamber, which, in the construction illustrated is cylindrical and provided at its upper end with a hopper 2 for the introduction of the pulverous charge. Arranged in the lower part of the furnace is an outlet 3 for the iron and a centrally arranged outlet 4 for the gases, developed during the chemical reactions in the furnace.

Opening into the upper part of the furnace is the contracted mouth of a tangentially arranged pipe or nozzle 5 for air or gas. The air or gas is introduced into the furnace through the pipe 5 with great velocity by pressure or suction and owing to its tangential direction and the great velocity imparted to the air or gas in its inlet nozzle said air or gas will flow around the cylindrical wall of the furnace. The gas or air will be thus caused to rapidly whirl or rotate within the furnace, carrying along with it the pulverous charge introduced through the hopper 2.

As the outlet 4 for the gases is arranged centrally in the lower part of the furnace the materials to be treated are caused to move in a spiral direction from the inlet to the outlet and the length of the furnace is such that the desired chemical actions will be fully completed during this passage. Thus the gas or air, entering the furnace at the circumference, moves in a spiral direction from the circumference to the central line of the furnace, in or near which the outlet 4 for the gases is provided. The material introduced in or near the central line of the furnace through hopper 2, will be subjected to the centrifugal force by means of the rotation imparted to it by the rotating gas or air, and will consequently move in a spiral direction from the center to the circumference of the furnace. Said opposite movements of the gas or air and of the material will contribute to the performance of the chemical reactions between the gas or air and the material introduced through hopper 2.

By means of any suitable device, which however is no part of the present invention and is therefore not shown on the drawing, the introduction of the pulverulent charge and the gas or air is made uniform and can be regulated.

For extracting iron the charge consists of iron ore, slag forming materials, and carbon, which is burned to $CO$ in the upper part of the furnace. The gas introduced through pipe 5 may consist of carbon monoxid or of air, which if desired, may be mixed with carbon so as to form carbon monoxid within the furnace. The molten metal and slag gather on the inner surface of the furnace wall owing to the centrifugal force to which they are submitted during the rotation or whirling, and flow down continually to the annular chamber around the gas outlet 4 at the bottom of the furnace, from which they are withdrawn through the outlet 3.

If it be desired to establish an oxidizing zone in the lower part of the furnace a pipe 6 is arranged tangentially, in the same manner as the pipe 5, and through which air is delivered to the furnace by pressure or suction. By the aid of said air the carbon monoxid (CO) formed in the upper part of the furnace, may be burned to carbon-dioxid ($CO_2$); the heat thus generated being advantageous to the successful working of the furnace.

The gases generated escape through the outlet 4 which, in the construction shown on the drawing, is arranged as a twyer, having a hollow wall and which is cooled by means of a water current circulating through the pipes 7 and 8. This arrangement of outlet is provided in order to avoid obstruction by dust following the gases, such dust having less tendency to adhere to the surfaces of the twyer when water cooled.

It will be understood that if required an oxidizing zone may be formed in the upper part of the furnace and a reducing zone in the lower part of the furnace; the invention is thus applicable for the oxidation of ores as well as for the reduction of oxids.

The invention is not limited to the treatment of pulverous or solid material, but is also applicable to the treatment of liquid or gaseous materials, said materials being introduced in the center of the furnace, whereas a gas current is introduced tangentially at the circumference of the furnace. For instance petroleum may be employed in the furnace, which, as a fuel for the purpose of obtaining an oxidizing or reducing flame is introduced through an opening in the roof of the furnace, a hot air current being simultaneously introduced tangentially through the pipe 5. In such a furnace the petroleum will be intimately mixed with the air and burned to carbon monoxid or to carbon-dioxid according to the circumstances. The heat thus generated being utilized for any required purpose.

I am aware that, especially for coal-dust-stoves, it has been proposed to introduce the coal-dust through a hopper in a reservoir, in which the coal-dust is mixed with an air-current, introduced tangentially. The materials thus mixed do not react chemically upon one another, but the mixture so produced is conducted through suitable tubes to the stove. It is peculiar to the present invention that the chemical actions are carried out simultaneously with the mixing of the materials.

Having now particularly described and ascertained the nature of the said invention and in what manner the same is to be performed I declare that what I claim is:—

The process of bringing about violent chemical reaction between materials consisting in introducing the materials into the center of a spirally shaped rotating body of gaseous fluid in a furnace.

In testimony whereof I have signed my name to this specification in the presence of two subscribing witnesses.

CARL GUSTAF PATRIK DE LAVAL.

Witnesses:
 WALDEMAR BOMAN,
 CARL FRIBERG.